US005380782A

United States Patent [19]
Bogan, Jr.

[11] Patent Number: 5,380,782
[45] Date of Patent: Jan. 10, 1995

[54] POLYMERIC DISPERSANTS FOR CERAMIC MATERIALS

[75] Inventor: Leonard E. Bogan, Jr., Harleysville, Pa.

[73] Assignee: Rohm and Haas Company, Philadelphia, Pa.

[21] Appl. No.: 130,976

[22] Filed: Oct. 4, 1993

[51] Int. Cl.⁶ ............................................. C08K 3/38
[52] U.S. Cl. .................. 524/404; 524/413; 524/428; 524/430; 524/442; 524/443
[58] Field of Search .............. 524/404, 430, 443, 547, 524/442, 428, 413; 526/278, 287

[56] References Cited

U.S. PATENT DOCUMENTS

| | | | |
|---|---|---|---|
| 3,646,099 | 2/1972 | Dannels | 260/465.4 |
| 3,692,673 | 9/1972 | Hoke et al. | 210/52 |
| 3,709,815 | 1/1973 | Booth et al. | 210/701 |
| 3,806,367 | 4/1974 | Lange et al. | 210/700 |
| 3,898,037 | 8/1975 | Lange et al. | 134/3 |
| 3,928,196 | 12/1975 | Persinski et al. | 210/699 |
| 3,991,029 | 11/1976 | Adelman | 524/413 |
| 4,143,020 | 3/1979 | Emmons | 524/547 |
| 4,228,327 | 9/1981 | Godlewski et al. | 210/698 |
| 4,301,266 | 11/1981 | Muenster et al. | 526/212 |
| 4,314,004 | 2/1982 | Stoneberg | 428/421 |
| 4,432,879 | 2/1984 | Greaves et al. | 210/699 |
| 4,711,725 | 12/1987 | Amick et al. | 210/701 |
| 4,885,097 | 12/1989 | Amjad et al. | 210/701 |
| 4,889,637 | 12/1989 | Amjad et al. | 210/701 |
| 4,933,090 | 6/1990 | Gill et al. | 210/700 |
| 4,936,987 | 6/1990 | Persinski et al. | 210/699 |
| 4,953,326 | 8/1990 | Amjad et al. | 210/701 |
| 4,956,316 | 9/1990 | Sawyer | 501/88 |
| 5,078,879 | 1/1992 | Gill et al. | 21/2.7 R |
| 5,109,090 | 4/1992 | Mongoin | 526/278 |
| 5,145,902 | 9/1992 | Ravet | 524/547 |
| 5,281,650 | 1/1994 | Burk et al. | 524/430 |

FOREIGN PATENT DOCUMENTS

| | | |
|---|---|---|
| 3743739 | 7/1989 | Germany . |
| 2082600 | 3/1982 | United Kingdom . |
| 8302607 | 8/1983 | WIPO . |
| 8302628 | 8/1983 | WIPO . |

OTHER PUBLICATIONS

Garino, "Heterocoagulation as an Inclusion Coating Technique For Ceramic Composite Processing," Journal of the American Ceramics Society, vol. 75[3], pp. 514–518, 1992.

Abstract of Mutsuddy, "Electrokinetic Behavior of Aqueous Silicon Carbide Whisker Suspensions," Journal of the American Ceramics Society, vol. 73[9], pp. 2747–2749, 1990.

Abstract of Ishii, et al., "Dispersion and Pressureless Sintering of AL203-SIC Whisker Composites", Ceramic Transcripts, vol. 1A, pp. 452–459, 1988.

Edited by Gary L. Messing, Edwin R. Fuller, Jr. and Hans Hausner, "Ceramic Transactions–Ceramic Powder Science II", International Conference on Ceramic Powder Processing Science, (1st: 1987: Orlando, Fla.).

*Primary Examiner*—Paul R. Michl
*Attorney, Agent, or Firm*—David T. Banchik

[57] ABSTRACT

An aqueous dispersion of ceramic materials and a method for preparing the same are provided. The method involves dispersing ceramic materials using one or more polymeric dispersants. The polymeric dispersants have monomer composition of from about 20 to about 95 percent by weight of one or more carboxylic acid monomers or salts thereof, from about 5 to about 80 percent by weight of one or more sulphonic acid or phosphonic acid monomers or salts thereof, and from about 3 to about 20 percent one or more monoethylenically unsaturated acid-free monomers.

9 Claims, No Drawings

POLYMERIC DISPERSANTS FOR CERAMIC MATERIALS

The present invention relates to polymeric dispersants for ceramic materials. More particularly, the present invention relates to polymeric dispersants for ceramic materials wherein the polymeric dispersant has sulfonated moieties. The use of these polymeric dispersants results in improved dispersion of ceramic materials.

Ceramic materials are often used to prepare lightweight, strong, thermally and chemically resistant products. Because of the difficulties associated with the handling of solid materials, it is desirable to be able to handle them as an aqueous dispersion of ceramic materials. Dispersions of ceramic materials are fairly unstable as shown by the formation of sediment upon standing, thereby rendering the dispersion non-homogeneous, difficult to use and potentially damaging to piping, pumps, and other dispersion handling mechanical equipment.

U.S. Pat. No. 4,450,013 to Hirsch et al., discloses the use of copolymers of acrylic or methacrylic acid and 2-acrylamido-2-methylpropanesulfonic acid as a grinding or dispersing agent for pigments. The pigments include chalk, clay, satin white, titanium dioxide, kaolin and dolomite.

In a first aspect of the present invention, there is provided an aqueous dispersion of ceramic materials comprising:
   (a) water
   (b) from about 0.1 to about 99 percent by weight of the dispersion of one or more ceramic materials
   (c) from about 0.01 to about 10 percent by weight based on the weight of the one or more ceramic materials of one or more polymeric dispersants wherein the polymeric dispersant contains, as polymerized units,
      (i) from about 20 to about 95 percent by weight of one or more carboxylic acid monomers selected from the group consisting of $C_3$–$C_6$ monoethylenically unsaturated monocarboxylic acids. $C_4$–$C_8$ monoethylenically unsaturated dicarboxylic acids, anhydrides of $C_4$–$C_8$ monoethylenically unsaturated cis-dicarboxylic acids and the alkali metal and ammonium salts thereof;
      (ii) from about 5 to about 80 percent by weight of one or more monomers selected from the group consisting of sulphonic acid monomers, phosphonic acids and salts thereof; and
      (iii) from 0 to about 80 percent by weight of one or more monoethylenically unsaturated acid-free monomers.

In a second aspect of the invention there is provided a method of preparing aqueous dispersions of ceramic materials comprising:
   (1) forming a mixture comprising
      (a) water
      (b) from about 0.1 to about 99 percent by weight of the dispersion of one or more ceramic materials
      (c) from about 0.01 to about 10 percent by weight based on the weight of the one or more ceramic materials of one or more polymeric dispersants wherein the polymeric dispersant contains, as polymerized units,
         (i) from about 20 to about 95 percent by weight of one or more carboxylic acid monomers selected from the group consisting of $C_3$–$C_6$ monoethylenically unsaturated monocarboxylic acids, $C_4$–$C_8$ monoethylenically unsaturated dicarboxylic acids, anhydrides of $C_4$–$C_8$ monoethylenically unsaturated cis-dicarboxylic acids and the alkali metal and ammonium salts thereof;
         (ii) from about 5 to about 80 percent by weight of one or more monomers selected from the group consisting of sulphonic acid monomers, phosphonic acid monomers and salts thereof; and
         (iii) from 0 to about 80 percent by weight of one or more monoethylenically unsaturated acid-free monomers.
   (2) agitating the mixture to form an aqueous dispersion of the ceramic material.

The ceramic materials suitable for the present invention are those which are capable of forming an aqueous dispersion in the presence of the one or more polymeric dispersants. Preferably, the ceramic material is silicon, silicon carbide, silica, silicon nitride, sialon, aluminum nitride, boron nitride, boron carbide, yttria, zirconia, alumina, or mixtures thereof. Most preferably, the ceramic material is silicon carbide. The ceramic materials may be in any of several forms. For example: suitable forms of silica include silica powder and fumed silica; suitable forms of silicon carbide include silicon carbide powder and silicon carbide whiskers.

The polymeric dispersants useful in the present invention contain, as polymerized units, from about 20 to about 95, preferably from about 30 to about 90, most preferably from about 40 to about 85 percent by weight of one or more carboxylic acid monomers selected from the group consisting of $C_3$–$C_6$ monoethylenically unsaturated monocarboxylic acids, $C_4$–$C_8$ monoethylenically unsaturated dicarboxylic acids, anhydrides of $C_4$–$C_8$ monoethylenically unsaturated cis-dicarboxylic acids and the alkali metal and ammonium salts thereof. Suitable examples of these carboxylic acid monomers include acrylic acid, methacrylic acid, crotonic acid, maleic acid, maleic anhydride, itaconic acid, mesaconic acid, fumaric acid, citraconic acid, vinylacetic acid, acryloxypropionic acid, 1,2,3,6-tetrahydrophthalic anhydride, 3,6-epoxy-1,2,3,6-tetrahydrophthalic anhydride, 5-norbornene-2,3-dicarboxylic anhydride, bicyclo[2.2.2]-5-octene-2,3-dicarboxylic anhydride, 3-methyl-1,2,6-tetrahydrophthalic anhydride, 2-methyl-1,3,6-tetrahydrophthalic anhydride, and the alkali metal and ammonium salts thereof. Preferred examples of these carboxylic acid monomers include acrylic acid, methacrylic acid, maleic acid, sodium salts thereof and ammonium salts thereof.

The polymeric dispersants useful in the present invention also contain, as polymerized units, from about 5 to about 80 percent, preferably from about 10 to about 70, most preferably from about 15 to about 60 percent by weight of one or more monomers selected from the group consisting of sulphonic acids monomers, phosphonic acid monomers and salts thereof. Suitable examples of these sulphonic acid monomers and phosphonic acid monomers include vinylsulfonic acid, styrenesulfonic acid, 2-acrylamido-2-methylpropanesulfonic acid, allylsulfonic acid, allyloxybenzenesulfonic acid, 2-hydroxy-3-(2-propenyloxy) propanesulfonic acid, isopropenylphosphonic acid, allylphosphonic acid, vinylphosphonic acid, alkali metal and ammonium salts thereof. Preferred examples of these sulphonic acid monomers and phosphonic acid monomers are styrenesulfonic acid, 2-acrylamido-2-methylpropanesulfonic acid, vinylphosphonic acid, sodium salts thereof and ammonium salts thereof.

The polymeric dispersants useful in the present invention may also contain, as polymerized units, up to about 80 percent, preferably from about 1 to about 50, most preferably from about 3 to about 20 percent by weight of one or more monoethylenically unsaturated acid-free monomers. Suitable monoethylenically unsaturated acid-free monomers include $C_1$-$C_4$ alkyl esters of acrylic or methacrylic acids such as methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate; acrylamides and alkyl-substituted acrylamides including acrylamide, methacrylamide, N-tertiarybutylacrylamide, N-methylacrylamide, and N,N-dimethylacrylamide; dimethylaminoethyl acrylate; dimethylaminoethyl methacrylate; acrylonitrile; methacrylonitrile; allyl alcohol; methallyl alcohol; phosphoethyl methacrylate; 2-vinylpyridene; 4-vinylpyridene; N-vinylpyrrolidone; N-vinylformamide; N-vinylimidazole; vinyl acetate; and styrene. Preferred examples of monoethylenically unsaturated acid-free monomers include butyl acrylate, methyl methacrylate, butyl methacrylate, hydroxyethyl acrylate, hydroxyethyl methacrylate, acrylamide, methacrylamide, N-tertiarybutylacrylamide and styrene.

If desired, it is possible to incorporate polyethylenically unsaturated compounds into the polymerization. Polyethylenically unsaturated compounds function as crosslinking agents and will result in the formation of higher molecular weight polymers. Preferably, the polymeric dispersants useful in the present invention are water soluble dispersants having a weight average molecular weight ($M_w$) of less than about 50,000, preferably from about 1,000 to about 15,000, as measured by aqueous gel permeation chromatography (gpc). Where "$M_w$" appears, it refers to the $M_w$ as measured by aqueous gpc relative to a poly(acrylic acid) standard having $M_w$ of 4,500. The polymeric dispersants can be used in their acid forms, or they can be used in a partially or fully neutralized form. The polymeric dispersants can be neutralized with any suitable base, such as alkali metal or ammonium hydroxides. Preferably, the anionic polymeric dispersant is fully neutralized with ammonium hydroxide or sodium hydroxide.

Methods for preparing the polymers useful is the present invention are well known to those skilled in the art of polymerization.

U.S. Pat. No. 4,314,004 is directed to one such suitable polymer synthesis method and the disclosure thereof is incorporated herein by reference. This method requires a specific concentration range of a polymerization initiator and a specific molar ratio range of the initiator concentration and the concentration of certain metal salts to obtain the desired polymers useful in the present invention. The preferred polymerization initiators are peroxide compounds such as ammonium persulfate, potassium persulfate, hydrogen peroxide and t-butyl hydroperoxide. The preferred concentration range of the initiator is between about 1 to about 20 weight percent based on the weight of monomers. The metal salt used to regulate molecular weight preferably includes cuprous and cupric chloride or bromide, cupric sulfate, cupric acetate, ferrous and ferric chloride, ferrous sulfate and ferric and ferrous phosphate. The molar ratio of the polymerization initiator to the metal salt is preferably between about 40:1 to about 80:1. The polymers useful in this invention are preferably prepared in water at a polymer concentration of about 40 to about 50 percent based on total weight of solution.

Another method useful to prepare the polymers useful in the present invention is described in U.S. Pat. No. 4,301,266, the disclosure thereof also being incorporated herein by reference. In this process isopropanol is used as the molecular weight regulator as well as the reaction solvent. The reaction solvent may also be an aqueous mixture of isopropanol containing at least 45 weight percent isopropanol. The polymerization initiator is a free radical initiator such as hydrogen peroxide, sodium persulfate, potassium persulfate, or benzoyl peroxide. The polymerization is carried out under pressure at a temperature of 120° to 200° C. The concentration of the polymer in the solvent is preferably 25 to 45 percent based on the weight of the total solution. When polymerization is complete, the isopropanol is distilled from the reactor, and the polymer may be neutralized with a base.

Still another method for polymers useful in this invention is described in U.S. Pat. No. 3,646,099, the disclosure thereof also being incorporated herein by reference. This process is directed to the preparation of cyano-containing oligomers; however, it is also applicable for preparing low molecular weight polymers useful in the present invention. This process employs a bisulfite salt as the polymerization molecular weight regulator, and the resulting polymers prepared thereby are sulfonate terminated. The preferred bisulfite salt is sodium bisulfite at a concentration of between 3 and 20 weight percent based on the weight of monomers. The free radical polymerization initiator is ammonium, sodium or potassium persulfate, hydrogen peroxide or t-butyl hydroperoxide. The concentration of the initiator is between about 0.2 to about 10 weight percent based on monomers. The polymerization temperature is preferably between 20° and 65° C., and the concentration of the polymers in the aqueous solvent is between 25 and 55 weight percent based on total solution weight.

The one or more polymeric dispersants are preferably present in the dispersion at level of from about 0.01 to about 10 percent by weight, and most preferably from about 0.05 to about 8 percent by weight based on the weight of the ceramic materials. Several factors may affect the preferred level of dispersant in a dispersion. For example, the morphology of the one or more ceramic materials may affect the optimum level of dispersant whereby more spherical particles generally require less dispersant. Also, dispersions having a high pH generally require less dispersant than dispersions at lower pH. The surface area of the ceramic material may also affect the optimum level of dispersant whereby ceramic materials having higher surface areas will generally require more dispersant. The ionic strength (or water hardness) of the dispersion may affect the optimum level of dispersant whereby dispersions having higher ionic strength generally require more dispersant. The ionic strength of the dispersion can be controlled, for example, by using distilled, deionized, partially distilled or partially deionized water, by controlling the level of contaminants introduced into the dispersion by the various components of the dispersion or by adding one or more conventional chelating agents to the dispersion.

Preferably, the water hardness of the dispersion which is attributable to multivalent cations is below about 600 parts per million ("ppm") expressed as $Ca^{2+}$, most preferably below about 500 ppm.

The one or more ceramic materials are preferably present in the dispersion at a level of from about 0.01 to about 99 percent by weight. Several factors, including the end-use of the dispersion, may affect the level at which the ceramic material is present in the dispersion. For example, the morphology of the one or more ceramic materials may affect the extent to which the one or more ceramic materials may be present in the dispersion whereby more spherical particles can generally be used at higher levels. The particle size and particle size distribution of the one or more ceramic materials may affect the extent to which the one or more ceramic materials may be present in the dispersion whereby bimodal distributions which allow for close packing arrangements can generally be used at higher levels. Also, more dense ceramic materials will account for a greater weight percent of a dispersion on an equal volume basis. Silicon carbide whisker dispersions preferably contain from about 0.1 to about 6.0, most preferably from about 0.5 to about 4.0 percent by weight of silicon carbide whiskers based on the total weight of the dispersion. Dispersions of zirconia may contain up to about 99 percent by weight of zirconia based on the total weight of the dispersion.

In addition to water, the one or more ceramic materials and the one or more polymeric dispersants, the dispersions of the present invention may optionally contain one or more other conventional additives. Conventional additives to an aqueous ceramic material dispersion include, for example, ceramic binders, releasing agents, sintering aids, rheology modifiers, lubricants and plasticizers. If used, each of the conventional additives may be present at a level of up to about 20 percent by weight based on the weight of the ceramic materials in the dispersion, and are preferably present at a level of from about 0.1 to about 10 percent by weight based on the weight of the ceramic material in the dispersion.

The following examples are set forth to illustrate the present invention. The present invention is not intended to be limited thereby.

The polymers appearing in Table I were evaluated as dispersants for ceramic materials. The entries in Table I for monomer component (i) are the weight percent of the acrylic acid as the carboxylic acid monomer; the entries in Table I for monomer component (ii) are the weight percent of the 2-acrylamido-2-methylpropane-sulfonic acid as the sulphonic acid monomer; and the entries in Table I for monomer component (iii) are the weight percent of the N-tertiarybutylacrylamide as the monoethylenically unsaturated acid-free monomer. The comparative polymer is Darvan 821A, available from R. T. Vanderbilt as an ammonium dispersing agent for ceramic bodies. The polymers are all used as aqueous polymer solutions. The percent by weight of polymer in these aqueous polymer solutions is reported in Table I as "Weight % solids."

TABLE I

| Sample | Monomer Component (i) | (ii) | (iii) | Salt Form | $M_w$ | Weight % solids |
|---|---|---|---|---|---|---|
| POLYMER A | 62 | 23 | 15 | Na salt | 5000 | 45 |
| POLYMER B | 65 | 27 | 8 | Na salt | 4500 | 44 |
| POLYMER C | 60 | 40 | | Na salt | 11000 | 37 |
| POLYMER D | 77 | 23 | | Na salt | 4500 | 44 |
| COMPARATIVE POLYMER | 100 | | | $NH_4$ salt | 6000 | 40 |

Evaluation of Polymeric Dispersants

The following procedure was used to evaluate the polymeric dispersants as dispersants for silicon carbide whiskers, unless otherwise indicated:

To a Waring blender container was added 200 grams of deionized water and a sufficient quantity of calcium chloride to achieve a predetermined hardness level. To the water was added 0.08 grams of polymeric dispersant solution. This mixture was stirred on a Waring blender at low speed for 15 seconds. To this mixture was added 2.0 grams of silicon carbide whiskers. The mixture was stirred on a Waring blender at low speed for 15 seconds. The pH of the mixture was adjusted to within the range of from 9.5 to 10.0 with aqueous ammonium hydroxide. The mixture was then stirred on a Waring blender for 2 minutes at low speed. Immediately after the blender stopped, the mixture was poured into a 500 milliliter beaker and 25 milliliters of the mixture was poured from the beaker into a 25 milliliter graduated cylinder. The cylinder was stoppered and left undisturbed. The level of sediment at the bottom of the cylinder was recorded at regular intervals.

The data appearing in Table II are the results of evaluations conducted on silicon carbide whisker samples which are the precursors to "R-grade" silicon carbide whiskers. "R-grade" silicon carbide whiskers are available from Advanced Refractory Technologies, Buffalo, N.Y. The ionic strength of the water used to prepare the dispersions shown in Table II was 40 ppm hardness expressed as $Ca^{2+}$. The data reported in Table II below are the levels, in milliliters, of sediment observed after the amount of time indicated in minutes ("min") or hours ("hr").

TABLE II

| | 5 min | 15 min | 1 hr | 2 hr |
|---|---|---|---|---|
| POLYMER A | <1 | <1 | 1 | 1 |
| COMPARATIVE POLYMER | 20 | 13.5 | 10 | 10 |

The data reported in Table III, below, are the results of dispersions prepared in the same manner as above except that the amount of polymer dispersant solution used, in grams, is that reported in Table III as "Grams." The data appearing in Table III are the results of evaluations conducted on silicon carbide whisker samples which are the precursors to "R-grade" silicon carbide whiskers. The ionic strength of the water used to prepare the dispersions is shown in Table III as "Hardness" and is reported in ppm expressed as $Ca^{2+}$. The data reported in Table III below are the levels, in milliliters, of sediment observed after the amount of time indicated.

TABLE III

| | Grams | Hardness | pH | 5 min | 15 min | 1 hr | 2 hr | 24 hr |
|---|---|---|---|---|---|---|---|---|
| COMPARATIVE POLYMER | 0.14 | 160 | 9.6 | 3 | 2.8 | 2.6 | 3 | 3 |
| POLYMER A | 0.08 | 40 | 9.6 | <1 | <1 | 1 | <2 | <2 |
| POLYMER A | 0.08 | 320 | 9.5 | <1 | <1 | 1 | 2 | 2.2 |
| POLYMER B | 0.08 | 320 | 9.5 | <1 | <1 | 2 | 2 | 2 |
| POLYMER C | 0.10 | 320 | 9.6 | <1 | <2 | <2 | 2 | 2 |
| POLYMER D | 0.08 | 320 | 9.6 | <1 | <2 | <2 | 2.6 | 2.8 |

The data reported in Table IV, below, are the results of dispersions prepared in the same manner as above except that the amount of polymer dispersant solution used, in grams, is that reported in Table IV as "Grams." The data appearing in Table IV are the results of evaluations conducted on silicon carbide whisker samples which are the precursors to "M-grade" silicon carbide whiskers. "M-grade" silicon carbide whiskers are available from Advanced Refractory Technologies, Buffalo, N.Y. The ionic strength of the water used to prepare the dispersions is shown in Table IV as "Hardness" and is reported in ppm expressed as $Ca^{2+}$. The data reported in Table IV below are the levels, in milliliters, of sediment observed after the amount of time indicated.

TABLE IV

| | Grams | Hardness | 5 min | 15 min | 1 hr | 2 hr | 24 hr |
|---|---|---|---|---|---|---|---|
| COMPARATIVE POLYMER | 0.14 | 400 | 2.2 | 2.2 | 2.6 | 2.7 | 2.7 |
| POLYMER A | 0.08 | 400 | <1 | <2 | <2 | <2 | <2 |
| POLYMER B | 0.08 | 400 | * | 2.3 | 2.2 | 2.2 | 2.2 |
| POLYMER C | 0.10 | 400 | <1 | 1 | <2 | <2 | <2 |
| POLYMER D | 0.08 | 400 | 3.8 | 2.8 | 2.6 | 2.6 | 2.6 |

*After 5 minutes, the dispersion did not exhibit a distinct level of sedimentation.

The data reported in Table V, below, are the results of dispersions prepared in the same manner as above except: (a) the amount of polymer dispersant solution used, in grams, is that reported in Table III as "Grams"; (b) the level of the silicon carbide whiskers used was increased by a factor of 2, 3, 4 and 6 respectively, reported in Table V as "Factor"; and (c) distilled water was used. The data appearing in Table V are the results of evaluations conducted on silicon carbide whisker samples which are the precursors to "R-grade" silicon carbide whiskers. The data reported in Table V below are the levels, in milliliters, of sediment observed after the amount of time indicated. In all of the examples reported in Table V, Polymer A was used as the dispersant.

TABLE V

| Factor | Grams | 5 min | 15 min | 1 hr | 2 hr | 24 hr |
|---|---|---|---|---|---|---|
| 2 | 0.08 | <1 | 1 | <2 | <2 | 2.2 |
| 3 | 0.12 | <2 | 2 | 2.6 | 2.5 | 2.9 |
| 4 | 0.16 | 2.9 | 3 | 3.4 | 3.5 | 4.1 |
| 6 | 0.24 | 4.7 | 4.4 | 4.4 | 4.2 | 5.8 |

The following procedure was used to evaluate Polymer A as a dispersant for various ceramic materials.

To a 00-ball mill jar was added deionized water (in an amount reported in grams in Table VI as "Water"), polymer dispersant solution (in an amount reported in grams in Table VI as "Polymer"), ceramic material (the type of ceramic material is reported in Table VI as "Ceramic" and the amount of ceramic material is reported in grams in Table VI as "Amount"), and 700 grams of alumina grinding media (approximately ½ inch × ½ inch cylinders). The ball mill jar was sealed and the contents were milled for 60 minutes at about 84 revolutions per minute. The dispersion of ceramic material was separated from the grinding media and the viscosity of the dispersion was measured on a Brookfield viscometer at 60 revolutions per minute using either a #1 or #3 spindle. The viscosity is reported in Table VI below as centipoises ("cps"). Lower viscosity, as indicated by lower cps, indicates a better dispersion. The silicon used was S-2021 purchased from CERAC in Milwaukee, Wis. The silicon nitride used was SN-F1 purchased from Denka, a Japanese company. The zirconia used was SCCA4 purchased from Magnesium Elektron, Inc. in Flemington, N.J. The yttria used was Y-1037 purchased from CERAC in Milwaukee, Wis. The silicon carbide used was BSC-21 purchased from Ferro Corporation in Milwaukee, Wis. The silicon dioxide was used was S-743 purchased from Fischer in Fairlawn, N.J.

TABLE VI

| Ceramic | Amount | Water | Polymer | Viscosity |
|---|---|---|---|---|
| silicon | 91 | 91 | 0.09 | 10.5* |
| silicon nitride | 101 | 101 | 0.10 | 7.0* |
| zirconia | 111 | 111 | 0.11 | 5.5* |
| yttria | 83 | 83 | 0.08 | 385 |
| silicon carbide | 99 | 99 | 0.99 | 1120 |
| silicon dioxide | 94 | 188 | 0.94 | 310 |

*#1 spindle was used
3 spindle was used

I claim:
1. An aqueous dispersion of ceramic materials, comprising:
   (a) water
   (b) from about 0.1 to about 99 percent by weight of the dispersion of one or more ceramic materials selected from the group consisting of silicon, silicon carbide, silicon nitride, sialon, aluminum nitride, boron nitride, boron carbide, yttria, zirconia, and alumina
   (c) from about 0.01 to about 10 percent by weight based on the weight of the one or more ceramic materials of one or more polymeric dispersants wherein the polymeric dispersant contains, as polymerized units
      (i) from about 40 to about 85 percent by weight of one or more carboxylic acid monomers selected from the group consisting of $C_3$–$C_6$ monoethylenically unsaturated monocarboxylic acids, $C_4$–$C_8$ monoethylenically unsaturated dicarbox- ylic acids, anhydrides of $C_4$–$C_8$ monoethylenically unsaturated cis-dicarboxylic acids and the alkali metal and ammonium salts thereof;

(ii) from about 15 to about 60 percent by weight of one or more monomers selected from the group consisting of sulphonic acid monomers, phosphonic acids and salts thereof; and (iii) from about 3 to about 20 percent by weight of N-tertiarybutylacrylamide.

2. The aqueous dispersion of claim 1, wherein: the one or more ceramic materials is silicon carbide.

3. The aqueous dispersion of claim 1, wherein: the one or more carboxylic acid monomers are selected from the group consisting of acrylic acid, methacrylic acid, crotonic acid, maleic acid, maleic anhydride, itaconic acid, mesaconic acid, fumaric acid, citraconic acid, vinylacetic acid, acryloxypropionic acid, 1,2,3,6-tetrahydrophthalic anhydride, 3,6-epoxy-1,2,3,6-tetrahydrophthalic anhydride, 5-norbornene-2,3-dicarboxylic anhydride, bicyclo[2.2.2]-5-octene-2,3-dicarboxylic anhydride, 3-methyl-1,2,6-tetrahydrophthalic anhydride, 2-methyl-1,3,6-tetrahydrophthalic anhydride, and the alkali metal and ammonium salts thereof.

4. The aqueous dispersion of claim 1, wherein: the one or more carboxylic acid monomers are selected from the group consisting of acrylic acid, methacrylic acid, maleic acid, sodium salts thereof and ammonium salts thereof.

5. The aqueous dispersion of claim 1, wherein: the sulphonic acid monomers are selected from the group consisting of vinylsulfonic acid, styrenesulfonic acid, 2-acrylamido-2-methylpropanesulfonic acid, allylsulfonic acid, allyloxybenzenesulfonic acid, 2-hydroxy-3-(2-propenyloxy) propanesulfonic acid, isopropenylphosphonic acid, and the alkali metal and ammonium salts thereof.

6. The aqueous dispersion of claim 1, wherein: the sulphonic acid monomers are selected from the group consisting of 2-acrylamido-2-methylpropanesulfonic acid, sodium salts thereof and ammonium salts thereof.

7. The aqueous dispersion of claim 1, wherein: the phosphonic acid monomer is selected from the group consisting of allylphosphonic acid, vinylphosphonic acid, sodium salts thereof and ammonium salts thereof.

8. An aqueous dispersion of silicon carbide, comprising:
  (a) water
  (b) from about 0.1 to about 6 percent by weight of the dispersion of silicon carbide (c) from about 0.01 to about 10 percent by weight based on the weight of the one or more ceramic materials of one or more polymeric dispersants wherein the polymeric dispersant contains, as polymerized units
    (i) from about 40 to about 85 percent by weight of one or more carboxylic acid monomers selected from the group consisting of acrylic acid, methacrylic acid, alkali metal salts thereof and ammonium salts thereof;
    (ii) from about 15 to about 60 percent by weight of one or more monomers selected from the group consisting of 2-acrylamido-2-methylpropanesulfonic acid, alkali metal salts thereof and ammonium salts thereof; and
    (iii) from about 3 to about 20 percent by weight of N-tertiarybutylacrylamide.

9. A method of preparing aqueous dispersions of ceramic materials comprising:
  (1) forming a mixture comprising
    (a) water
    (b) from about 0.1 to about 99 percent by weight of the dispersion of one or more ceramic materials selected from the group consisting of silicon, silicon carbide, silicon nitride, sialon, aluminum nitride, boron nitride, boron carbide, yttria, zirconia, and alumina
    (c) from about 0.01 to about 10 percent by weight based on the weight of the one or more ceramic materials of one or more polymeric dispersants wherein the polymeric dispersant contains, as polymerized units
      (i) from about 40 to about 85 percent by weight of one or more carboxylic acid monomers selected from the group consisting of $C_3$–$C_6$ monoethylenically unsaturated monocarboxylic acids, $C_4$–$C_8$ monoethylenically unsaturated dicarboxylic acids, anhydrides of $C_4$–$C_8$ monoethylenically unsaturated cis-dicarboxylic acids and the alkali metal and ammonium salts thereof;
      (ii) from about 15 to about 60 percent by weight of one or more monomers selected from the group consisting of sulphonic acid monomers, phosphonic acid monomers and salts thereof; and
      (iii) from about 3 to about 20 percent by weight of N-tertiarybutylacrylamide; (2) agitating the mixture to form an aqueous dispersion of the ceramic material.

* * * * *